(12) United States Patent
Henderson et al.

(10) Patent No.: US 12,158,369 B2
(45) Date of Patent: Dec. 3, 2024

(54) SYSTEMS AND METHODS FOR DETERMINING A WEIGHT RATING OF A TRANSPORTER

(71) Applicant: Cistant, LLC, Cleveland, TN (US)

(72) Inventors: Jay Henderson, Kennesaw, GA (US); Rob Lipop, Salt Lake City, UT (US); Ryan Carney, Kennesaw, GA (US); David Daugherty, Annapolis, MD (US)

(73) Assignee: Cistant, LLC, Cleveland, TN (US)

( * ) Notice: Subject to any disclaimer, the term of this patent is extended or adjusted under 35 U.S.C. 154(b) by 217 days.

(21) Appl. No.: 17/975,826

(22) Filed: Oct. 28, 2022

(65) Prior Publication Data

US 2023/0139320 A1    May 4, 2023

Related U.S. Application Data

(60) Provisional application No. 63/273,478, filed on Oct. 29, 2021.

(51) Int. Cl.
  *G01G 19/03*    (2006.01)
  *G01G 19/12*    (2006.01)

(52) U.S. Cl.
  CPC .......... *G01G 19/035* (2013.01); *G01G 19/12* (2013.01)

(58) Field of Classification Search
  CPC ..... G01G 19/035; G01G 19/12; G01G 19/021
  See application file for complete search history.

(56) References Cited

U.S. PATENT DOCUMENTS

| | | | | |
|---|---|---|---|---|
| 4,941,365 A | * | 7/1990 | Reiner | B60T 8/58 177/136 |
| 5,877,455 A | * | 3/1999 | Kyrtsos | G01G 19/035 177/136 |
| 6,137,066 A | * | 10/2000 | W.ang.nelid | G01G 19/035 177/125 |
| 2014/0190753 A1 | * | 7/2014 | Mian | G01G 19/035 177/136 |
| 2018/0149554 A1 | * | 5/2018 | Kim | G01G 19/035 |
| 2019/0107433 A1 | * | 4/2019 | Valdemarsson | G01G 19/035 |
| 2019/0178701 A1 | * | 6/2019 | Hall | G01G 19/62 |
| 2019/0206240 A1 | * | 7/2019 | Gonçalves | G08G 1/04 |
| 2021/0088375 A1 | * | 3/2021 | Valdemarsson | G01G 19/035 |
| 2021/0300438 A1 | * | 9/2021 | Granieri | G06V 20/58 |
| 2023/0024822 A1 | * | 1/2023 | Ahmed | H02N 2/181 |

* cited by examiner

*Primary Examiner* — Mussa A Shaawat

(74) *Attorney, Agent, or Firm* — Berenzweig Leonard, LLP; Clyde Findley

(57) ABSTRACT

Embodiments of the present invention are directed to a new and improved system and method for determining a weight rating for a surface road transporter by using a computing system and digital camera to identify various attributes of the transporter and then, based on those attributes, to determine a maximum allowable load limit for that transporter in a given jurisdiction. In addition, embodiments of the present invention may include a digital optical device and related software configured to scan and decipher a QR code printed on an "overweight" permit issued by a local jurisdiction, where the overweight permit authorizes a specific transporter to carry a load that exceeds its normal gross allowable weight by a specified amount or percentage. Embodiments of the present invention may incorporate the specified overage amount or percentage in its determination of the gross allowable weight rating for that transporter.

1 Claim, 14 Drawing Sheets

SYSTEMS AND METHODS FOR DETERMINING A WEIGHT RATING OF A TRANSPORTER

CROSS-REFERENCE TO RELATED APPLICATIONS

This application claims priority under 35 U.S.C. § 119(e) to U.S. Provisional Patent Application No. 63/273,478, entitled "Systems and Methods for Determining Weight Rating of Transporter," filed on Oct. 29, 2021.

FIELD OF THE INVENTION

Embodiments of the present invention relate to a new and improved system and method for determining a weight rating for a surface road transporter (for example, a large tractor-trailer truck or "semi"). More particularly, embodiments of the present invention provide a new and improved system and method for determining a gross allowable weight value for a specific surface road transporter by using a computing system and digital camera to identify various visible attributes of the transporter and then, based on those visible attributes, to determine a maximum allowable load limit for that transporter in a given jurisdiction. In addition, embodiments of the present invention may include a digital optical device and related software configured to scan and decipher a QR code printed on an "overweight" permit issued by a local jurisdiction, where the overweight permit authorizes a specific transporter to carry a load that exceeds its normal gross allowable weight by a specified amount or percentage. Embodiments of the present invention may incorporate that specified overage amount or percentage in its determination of the gross allowable weight rating for that transporter.

BACKGROUND

Road transport of cargo is often accomplished by a surface road transporter, which may include a truck, optionally in combination with one or more trailers. Manufacturers often suggest maximum load restrictions for their transporters. Some governments also place maximum load restrictions on transporters. In many cases, government-imposed maximum load restrictions are based at least in part on the number and spacing of axles and/or axle groups on the transporter.

It can be difficult and/or time-consuming to objectively determine a reliable maximum load restriction for a given transporter configuration (a configuration, for example, comprising a specific tractor-trailer configuration with a certain number of axles and/or axle groups). To accomplish this task, a worker at a transport weighing station (or scale) will typically use a tape measure to measure the distance from one axle or axle group on the transporter to each adjoining axle or axle group, record that information, and then access one or more of a series of tables printed by a government jurisdiction to manually determine a gross allowable weight rating for the transporter configuration.

To address these limitations, embodiments of the present invention disclose systems and methods that make it easier and more efficient to determine a gross allowable weight rating of a transporter reliably and accurately for a given government jurisdiction. Such systems and methods for determining a gross allowable weight rating of a transporter are useful at least for: (1) promoting the safety and efficiency in the road-transport industry; (2) facilitating compliance with government regulations; and (3) identifying violations of and enforcing compliance with government regulations.

To achieve at least those ends, the following description discloses embodiments of systems and methods for determining a gross allowable weight rating for a transporter in a given jurisdiction.

SUMMARY OF THE INVENTION

This summary is provided to introduce certain concepts in simplified form that are further described below in the Detailed Description. This summary is not intended to identify key features or essential features of the claimed subject matter, nor is it intended to limit in any way the scope of the claimed invention.

In one embodiment, a computer method for determining the Gross Allowable Weight of a transporter comprises: obtaining with a camera a digital image of a transporter; providing a computer interface to facilitate marking the digital image to identify a number of axles or axle groups on the transporter; measuring the distance between the identified axles; calculating a weight capacity rating or Gross Allowable Weight rating for the transporter based on the number and spacing of identified and measured axles; and displaying the Gross Allowable Weight rating on a display.

In a second embodiment, a system and method for determining the weight rating of a transporter comprises: a camera, wherein the camera is configured to obtain a digital image of a transporter; a processor coupled to the camera, wherein the processor is configured to calculate a weight capacity rating or Gross Allowable Weight rating for the transporter; a display coupled to the processor, wherein the display is configured to display the digital image, and wherein the display is configured to display the weight capacity rating or Gross Allowable Weight; and an input device coupled to the processor, wherein the input device is configured to place vertical guide lines on the digital image to identify a number and/or location of axles on the transporter.

In a third embodiment, a system and method for determining the weight rating or Gross Allowable Weight for a transporter comprises: a processor configured to receive a digital image of the transporter, wherein the processor is configured to provide an identification of a plurality of axles on the transporter, and wherein the processor is configured to provide a calculated weight capacity rating or Gross Allowable Weight for the transporter, wherein the calculated Gross Allowable Weight for the transporter is based at least partially on the identification of the number and spacing of a plurality of axles on the transporter.

In a fourth embodiment, a system and method for determining the weight rating or Gross Allowable Weight for a transporter comprises: a processor configured to receive a digital image of the transporter, wherein the processor is configured to display the digital image of the transporter, interface with an operator to provide an identification of a plurality of axles and/or axle groups on the transporter, calculate a weight capacity rating or Gross Allowable Weight for the transporter, wherein the calculated Gross Allowable Weight for the transporter is based at least partially on the identification of the number and spacing of a plurality of axles on the transporter.

In addition, embodiments of the present invention may include a QR scanning device and related software configured to scan and decipher a QR code printed on an overweight permit issued by a local jurisdiction. An overweight permit is a permit issued by a government authority that authorizes a transporter to carry a load that exceeds its normal gross allowable weight by a specified amount or percentage. Embodiments of the present invention may use a QR code on an overweight permit to access government-supplied information about the transporter and incorporate the specified overage amount or percentage, as provided by the overweight permit, in its determination of the gross allowable weight rating for that transporter.

The above summary of embodiments of the present invention has been provided to introduce certain concepts that are further described below in the Detailed Description. The summarized embodiments are not necessarily representative of the claimed subject matter, nor do they span the scope of features described in more detail below. They simply serve as an introduction to the subject matter of the various claimed inventions.

BRIEF DESCRIPTION OF THE DRAWINGS

So that the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF THE EMBODIMENTS

Figure 1:
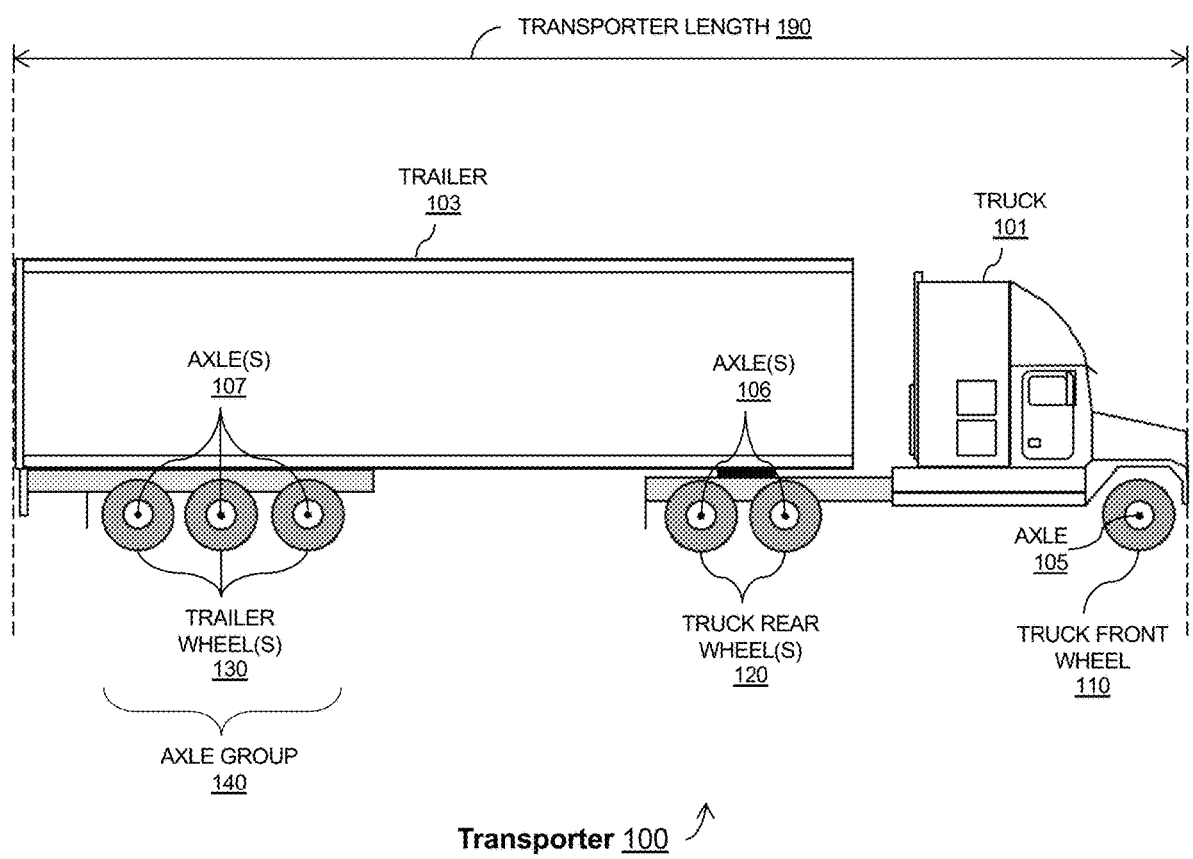
FIG. 1 illustrates a typical transporter configuration comprising a truck and a single trailer.

Embodiments of the present invention will now be described with reference to the accompanying drawings, wherein like parts are designated by like reference numerals throughout, and wherein the leftmost digit of each reference number refers to the drawing number of the figure in which the referenced part first appears.

Embodiments of the present invention herein are intended to be used to determine the appropriate maximum Gross Allowable Weight of a surface road transporter, as allowed by federal, state, or local law (a jurisdiction). By accurately determining the maximum Gross Allowable Weight of a transporter, an operator can obtain and record documentary evidence of compliance with jurisdictional freight and cargo limitations.

Definitions

Unless otherwise defined, all terms (including technical and scientific terms) in this disclosure have the same meaning as commonly understood by one of ordinary skill in the art. It will be further understood that terms, such as those defined in commonly used dictionaries, should be interpreted as having a meaning that is consistent with their meaning in the context of the specification and should not be interpreted in an idealized or overly formal sense unless expressly defined otherwise in this disclosure. Thus, for brevity and/or clarity, well-known functions or constructions might not be described in detail.

The terms used throughout the disclosure are for the purpose of describing particular embodiments only and are not intended to be limiting. The singular forms "a," "an," and "the" are intended to include the plural forms as well, unless the context clearly indicates otherwise.

The terms "coupled to," "coupled with," "connected to," "in connection with," "in communication with," or "connecting" include any suitable connection or communication, including mechanical connection, electrical connection (e.g., one or more wires), or signal-conducting channel.

The term "transporter" is used herein to mean any combination of truck, freight truck, tractor, tractor trailer, semi-tractor trailer, trailer, or other hauling vehicle intended to transport products and/or material over surface roads.

The term Gross Vehicle Weight Rating ("GVWR") is the maximum loaded weight of a transporter vehicle, as determined by the transporter's manufacturer.

The term Maximum Gross Combined Weight ("MGCW") is the maximum loaded weight of a combined tractor and trailer that is allowed by federal, state, or local regulations.

The term Gross Axle Weight Rating ("GAWR") is the maximum downward force, or weight, allowed for each vehicle axle. The term GAWR is typically given for both the front axle (the front rating or "FR") and the rear axle (the rear rating or "RR").

The term Gross Trailer Weight ("GTW") is the actual total weight of a loaded trailer.

The term Tongue Weight is the downward force, or weight, exerted at the back of a transporter by the trailer load.

The terms Curb Weight and/or Empty Weight refer to the weight of a transporter apart from passengers or cargo.

The term Dry Weight is the weight of a transporter without passengers, cargo, or fluids.

Finally, the term Gross Allowable Weight ("GAW") or Gross Allowable Weight rating will be used herein to mean the maximum allowable load limit of a specific transporter configuration in a given jurisdiction. GAW is a weight rating normally expressed in pounds.

Transporters

FIG. 1 illustrates a typical Transporter 100 configuration comprising a Truck 101 and a single Trailer 103 connected to Truck 101. Truck 101 may comprise the tractor component of Transporter 100. Trailer 103 may comprise a container for carrying cargo, such as products and other material. Trailer 103 may be loaded or unloaded. Each of the Truck 101 and Trailer 103 may have wheels 110, 120, and 130 on Axles 105, 106, and/or 107 (respectively). For example, Truck 101 may have at least one Truck Front Wheel 110 on an Axle 105 and at least one Truck Rear Wheel 120 on an Axle 106. Trailer 103 may have at least one Trailer Wheel 130 on an Axle 107. When multiple axles are substantially adjacent to each other, the axles may form an "axle group." An axle group may have three axles, such as Axle Group 140, which refers to the entire group of Axles 107 each of which supports one of the Trailer Wheels 130.

Figure 2:
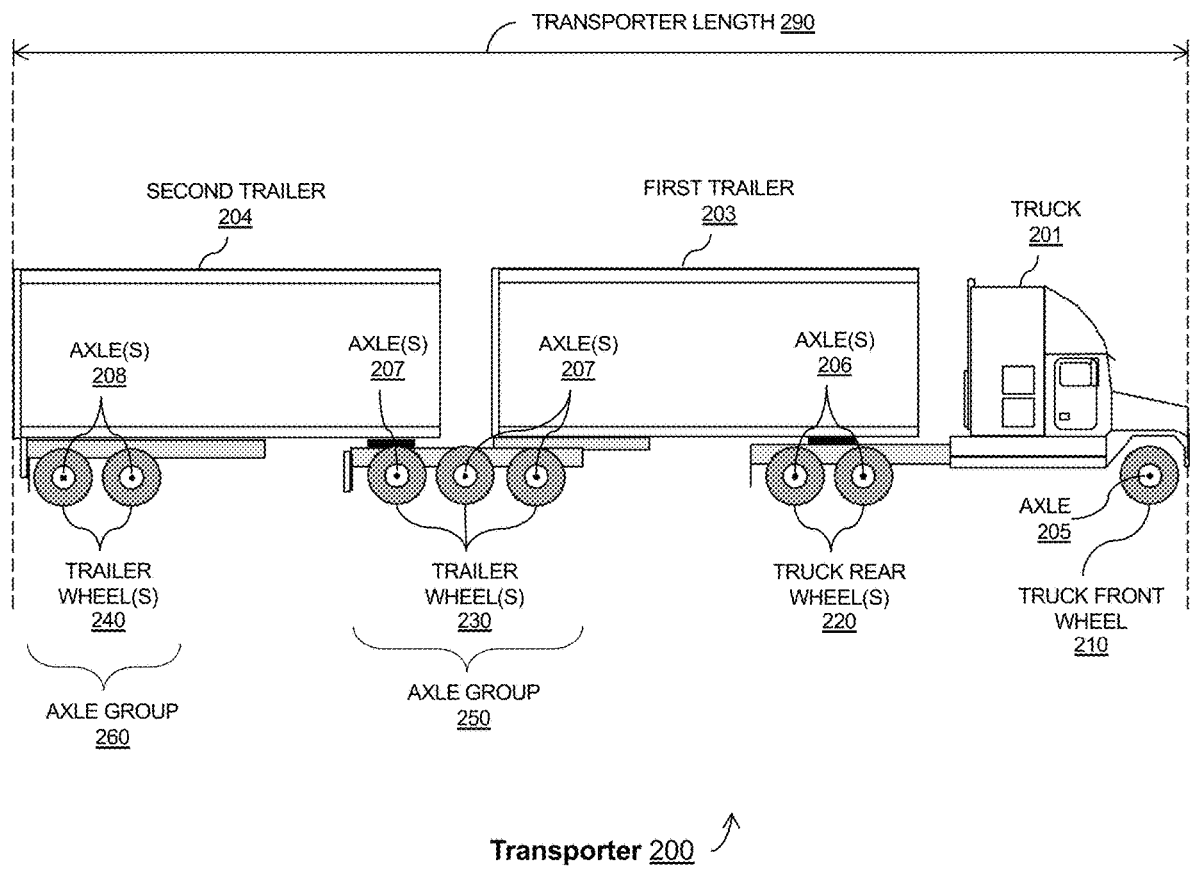
FIG. 2 illustrates a transporter configuration comprising a truck and two trailers.

FIG. 2 illustrates a Transporter 200 configuration comprising a Truck 201 and two trailers: a First Trailer 203 and a Second Trailer 204 connected in line, as shown, to Truck 201. Truck 201 may comprise the tractor component of Transporter 200. Trailers 203 and 204 may comprise containers for carrying cargo, such as products and other material. Trailers 203 and 204 may be loaded or unloaded. Each of the Truck 201, Trailer 203, and Trailer 204 may have wheels 210, 220, 230, and 240 on Axles 205, 206, 207, and 208 (respectively). For example, Truck 201 may have at least one Truck Front Wheel 210 on an Axle 205 and at least one Truck Rear Wheel 220 on an Axle 206. Trailer 203 may have at least one Trailer Wheel 230 on an Axle 207. Trailer 204 may have at least one Trailer Wheel 240 on an Axle 209. As in FIG. 1. FIG. 2 shows that when multiple axles are substantially adjacent to each other, the axles may form an "axle group." An axle group may have three axles, such as Axle Group 250, which refers to the entire group of Axles 107 supporting Trailer Wheels 230. Similarly, Axle Group 260 may have two axles and comprise Axles 208 supporting Trailer Wheels 240.

Figure 3:
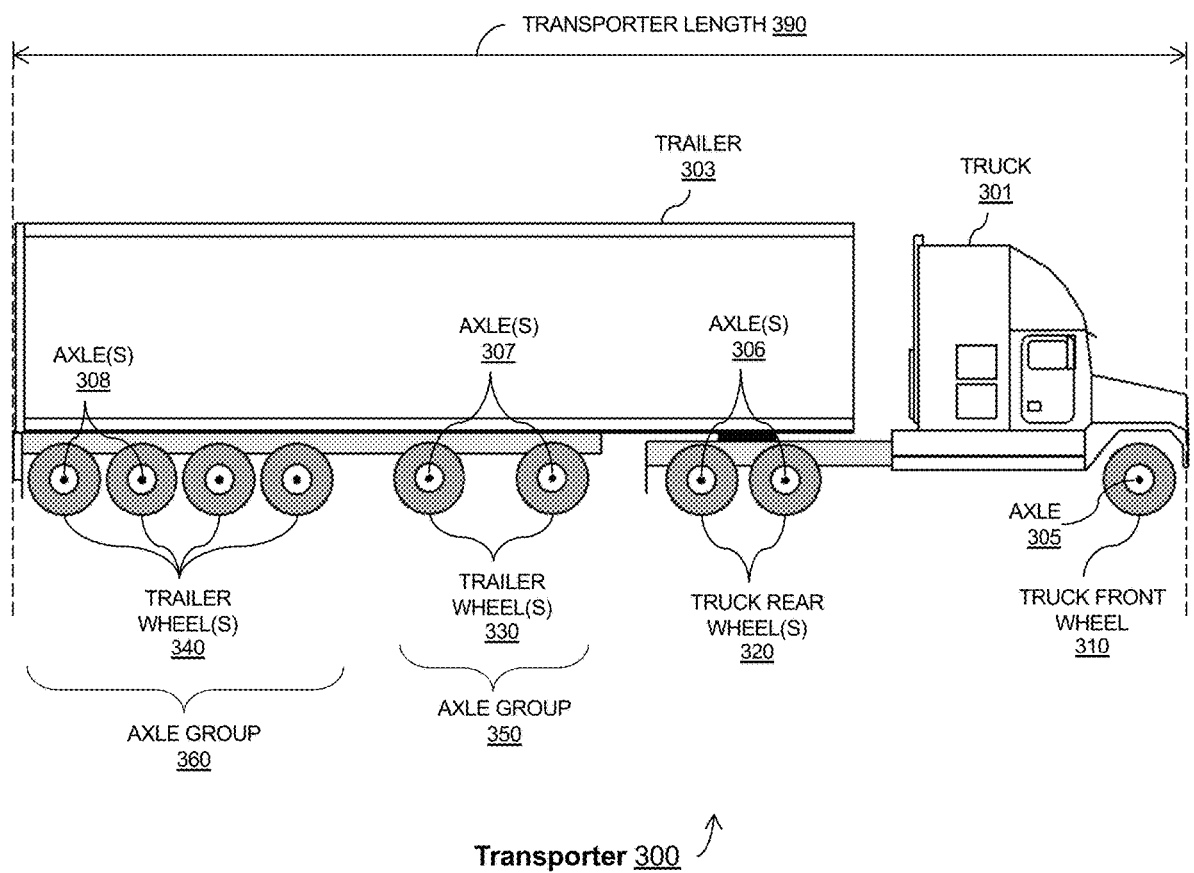
FIG. 3 illustrates a transporter configuration comprising a truck and a single trailer, where the trailer has more than one axle group.

FIG. 3 illustrates a Transporter 300 configuration comprising a Truck 301 and a single Trailer 303 connected to Truck 301, where the Trailer 303 has more than one axle group. Truck 301 may comprise the tractor component of Transporter 300. Trailer 303 may comprise a container for carrying cargo, such as products and other material. Trailer 303 may be loaded or unloaded. Each of the Truck 301 and Trailer 303 may have Wheels 310, 320, 330, and 340 on Axles 305, 306, 307, and 308 (respectively). For example, Truck 301 may have at least one Truck Front Wheel 310 on an Axle 305 and at least one Truck Rear Wheel 320 on an Axle 306. Trailer 303 may have at least one Trailer Wheel 330 on an Axle 307 and another Trailer Wheel 340 on an Axle 308. When multiple axles are substantially adjacent to each other, the axles may form an "axle group." An axle group may have two axles, such as Axle Group 350, which refers to the entire group of Axles 307 each of which supports one of the Trailer Wheels 330. An axle group may also have four axles, such as Axle Group 360, which refers to the entire group of Axles 308 each of which supports one of the Trailer Wheels 340.

In addition to the embodiments shown in each of FIGS. 1-3 wherein the Transporter 100, 200, or 300 has at least one Trailer 103, 203, 204, or 303, a transporter such as Transporter 100 may have a Truck 101 but no trailer. Similarly, a truck such as Truck 101 may comprise a "box" configuration (not shown but which is well known by those skilled in the art) where the trailer is supported by Truck Front Wheel(s) 110 and Truck Rear Wheel(s) 120 and not have separate trailer wheels, such as Trailer Wheel(s) 130.

The full length of any given transporter, such as Length 190, 290, or 390 (each shown individually in FIGS. 1, 2, and 3 respectively), is the distance from the front of the truck (such as Truck 101) to the back of the rearmost trailer (such as Trailer 103). If a transporter has no trailer, then the full length of the transporter is the distance from the front of the truck to the back of the truck.

Systems and Methods Overview

Figure 4A:
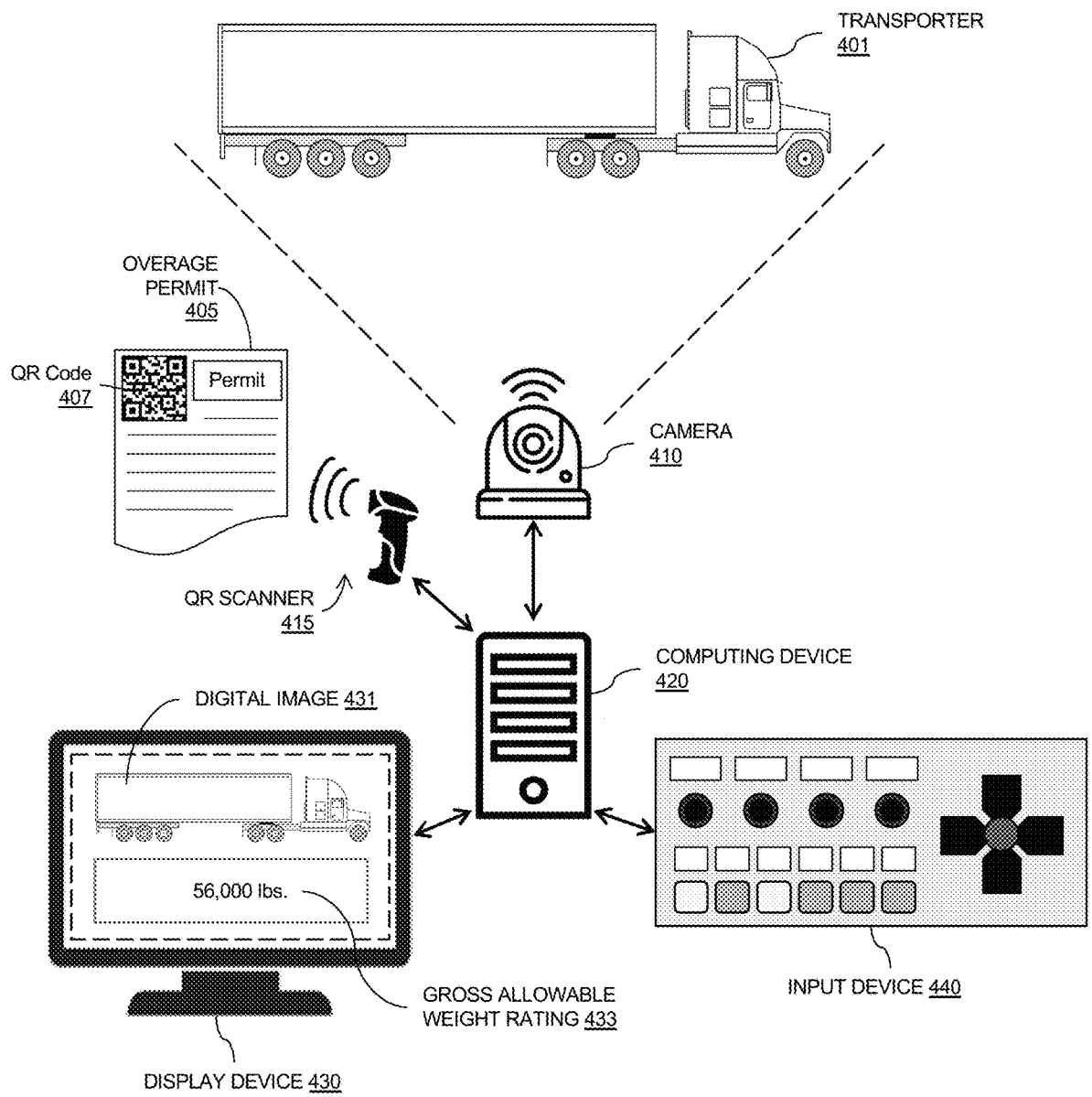
FIG. 4A is a block diagram of an exemplary embodiment of a system and method for determining a weight rating of a transporter, in accordance with the present invention.

FIG. 4A is a block diagram of an exemplary embodiment of a System and Method 400 for determining a weight rating of a Transporter 401, in accordance with the present invention. A Camera 410 may be positioned to visually capture an image comprising the full length of a Transporter 401. A QR Scanner 415 may be positioned to capture a QR code printed on an Overage Permit 405. Camera 410 may be electronically coupled or connected to a Computing Device 420. QR Scanner 415 may also be electronically coupled or connected to Computing Device 420. Computing Device 420 may then be electronically coupled or connected to a Display Device 430 and to an Input Device 440. Camera 410, QR Scanner 415, Computing Device 420, Display Device 430, and Input Device 440 may be electronically connected by a physical cable or may communicate with each other by various remote or wireless telecommunications technologies known by those skilled in the art.

Camera 410 may be configured to obtain a Digital Image 431 of a transporter such as Transporter 401. As mentioned above, Camera 410 may be connected by data-transmission cables to Computing Device 420. Alternatively, Camera 410 may comprise an internet-protocol device that transmits captured images wirelessly to Computing Device 420. Camera 410 may also be capable of receiving instructions from Computing Device 420, such as to capture an image, to zoom in or out, or to pan the Camera 410 in a selected direction. For example, Camera 410 may be a pan-tilt-zoom ("PTZ") camera that is capable of remote direction and zoom control. Display Device 430 may be configured to display the Digital Image 431 to a user (the user is not shown).

QR Scanner 415 may be configured to obtain data from a QR code, such as a QR Code 407 printed on Overage Permit 405. Data obtained from QR Code 407 may then allow software executing on Computing Device 410 to access the original government issued version of the Overage Permit 405 via a network and examine its contents directly, thereby minimizing the chance that the Overage Permit 405 has been improperly modified.

Computing Device

Figure 4B:
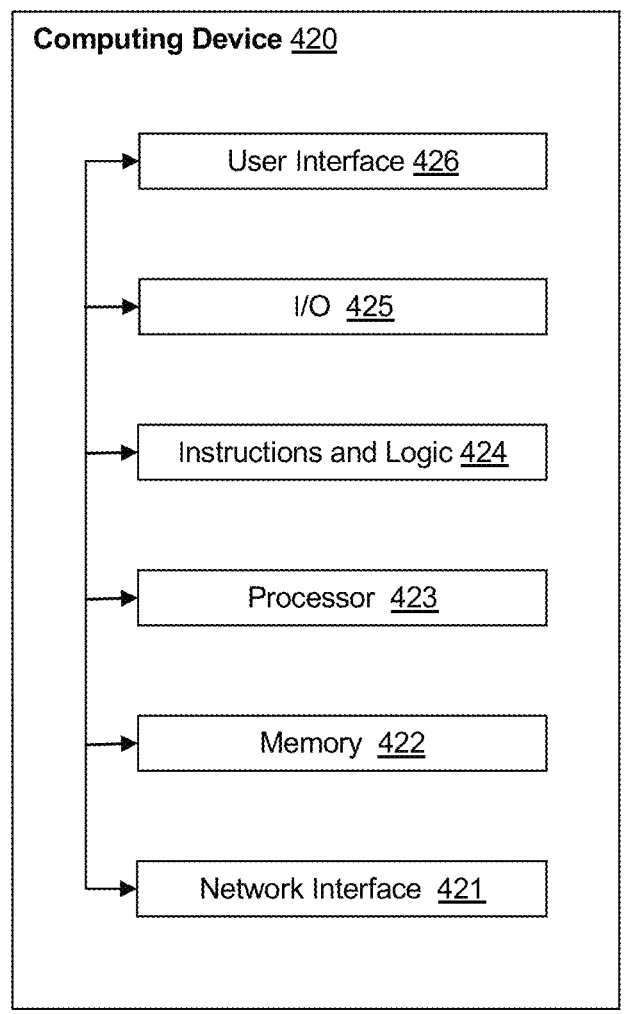
FIG. 4B a block diagram of a computing device for a system and method for determining a weight rating of a transporter, in accordance with the present invention.

FIG. 4B a block diagram of a Computing Device 420, first shown in FIG. 4A, for a system and method for determining a weight rating of a transporter, in accordance with the present invention. Computing Device 420 may be programmed with instructions for receiving commands from Input Device 440 for controlling Camera 410, for receiving and displaying Digital Image 431, and/or for manipulating Digital Image 431 on Display Device 430. Computing Device 420 may be configured to obtain the Digital Image 431 from the Camera 410 and to display the Digital Image 431 on the Display Device 430. Computing Device 420 may be further configured to calculate a Gross Allowable Weight Rating 433 (shown in FIG. 4A) for the Transporter 401. Gross Allowable Weight Rating 433 may be presented on the Display Device 430 as an overlay on top of Digital Image 431. In some embodiments, the calculated Gross Allowable Weight Rating 433 may be at least partially based on the number and spacing of the axles on Transporter 401 (see Axles 105, 106, and 107 of FIG. 1).

Staying with FIG. 4B, Computing Device 420 may comprise any device known in the art that is capable of processing data and/or information, such as any general purpose and/or special purpose computer, including as a personal computer, workstation, server, minicomputer, mainframe, supercomputer, computer terminal, laptop, tablet computer (such as an iPad), wearable computer, mobile terminal, Bluetooth device, communicator, smart phone (such as an iPhone, Android device, or BlackBerry), a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general, any device on which a finite state machine CAN reside that is capable of implementing at least a portion of the methods, structures, APIs, and/or interfaces described herein may comprise Computing Device 420.

Computing Device 420 may comprise components such as one or more Network Interfaces 421, one or more Processors 423, one or more Memories 422 where some Memories 422 contain Instructions and Logic 424, one or more Input/Output (I/O) Devices 425, and one or more User Interfaces 426, which may be coupled to the I/O Devices 425, etc.

A Memory 422 can be any type of apparatus known in the art that is capable of storing analog or digital information, such as instructions and/or data. Examples include a non-volatile memory, volatile memory, Random Access Memory (RAM), Static Random Access Memory (SRAM), Dynamic Random Access Memory (DRAM), Read Only Memory (ROM), Electronically Erasable Programmable Read-Only Memory (EEPROM), Programmable Read-Only Memory (PROM), Erasable Programmable Read-Only Memory (EPROM), flash memory, magnetic media, hard disk, solid state drive, floppy disk, magnetic tape, magnetic tunnel junction (MTJ) memory, optical media, optical disk, compact disk, CD, digital versatile disk, DVD, and/or RAID array, etc. Memory 422 can be coupled to a processor such as Processor 423 and/or can store instructions adapted to be executed by a processor, such as according to an embodiment disclosed herein.

In particular, the one or more Memories 422 may store computer executable instructions that, when executed by the one or more Processor 423, may cause the one or more Processors 423 to implement the methods, procedures, and/or techniques described herein. The one or more Processors 423 may be operably associated with the one or more Memories 422 so that the computer executable instructions can be provided to the one or more Processors 423 for execution. For example, the one or more Processors 423 may be operably associated to the one or more Memories 422 through one or more data buses and/or control busses. Furthermore, Computing Device 420 may possess or may be operably associated with Input/Output (I/O) Devices 425, including, for example, a keyboard, a keypad, controller, a mouse, a microphone, a touch screen, a sensor, a computer screen, a printer, or a speaker.

Input/Output (I/O) Device 425 may comprise any sensory-oriented input and/or output device known in the art, such as an audio, visual, and/or haptic device, including, for example, a monitor, display, projector, overhead display, keyboard, keypad, mouse, trackball, joystick, gamepad, wheel, touchpad, touch panel, pointing device, microphone, speaker, video camera, camera, scanner, printer, vibrator, tactile simulator, and/or tactile pad, optionally including a communications port for communication with other components in Computing Device 420.

Instructions and Logic 424 may comprise directions adapted to cause a machine, such as Computing Device 200, to perform one or more particular activities, operations, or functions. The directions, which can sometimes comprise an entity called a "kernel", "operating system", "program", "application", "utility", "subroutine", "script", "macro", "file", "project", "module", "library", "class", "object", or "Application Programming Interface," etc., can be embodied as machine code, source code, object code, compiled code, assembled code, interpretable code, and/or executable code, etc., in hardware, firmware, and/or software. Instructions and Logic 424 may reside in Processor 423 and/or Memory 422.

Network Interface 421 may comprise any device, system, or subsystem capable of coupling an information device to a network. For example, Network Interface 421 can comprise a telephone, cellular phone, cellular modem, telephone data modem, fax modem, wireless transceiver, Ethernet circuit, cable modem, digital subscriber line interface, bridge, hub, router, switch, or other similar device.

Processor 423 may comprise a device and/or set of machine-readable instructions for performing one or more predetermined tasks. Processor 423 can comprise any one or a combination of hardware, firmware, and/or software. Processor 423 can utilize mechanical, pneumatic, hydraulic, electrical, magnetic, optical, informational, chemical, and/or biological principles, signals, and/or inputs to perform the task(s). In certain embodiments, Processor 423 can act upon information by manipulating, analyzing, modifying, converting, transmitting the information for use by an executable procedure and/or an information device, and/or routing the information to an output device. Processor 423 can function as a central processing unit, local controller, remote controller, parallel controller, and/or distributed controller, etc. Unless stated otherwise, Processor 423 can comprise a general-purpose device, such as a microcontroller and/or a microprocessor, such the Pentium IV series of microprocessors manufactured by the Intel Corporation of Santa Clara, California. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. Other examples of Processors 423 include sequential state machines, microprocessors, microcontrollers, graphics processing units (GPUs), central processing units (CPUs), application processors, digital signal processors (DSPs), reduced instruction set computing (RISC) processors, systems on a chip (SoC), baseband processors, application specific integrated circuits (ASIC), field programmable gate arrays (FPGAs), programmable logic devices (PLDs), gated logic, and other suitable hardware configured to perform the various functionality described throughout this disclosure.

Computing Device 420 may execute an appropriate operating system such as LINUX®, UNIX®, MICROSOFT® WINDOWS®, APPLE® MACOS®, IBM® OS/2®, ANDROID®, and PALM® OS, and/or the like.

User Interface 426 may comprise any device and/or means for rendering information to a user and/or requesting information from the user, including Display Device 430. User Interface 426 may include, for example, at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or another visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. User Interface 426 can include one or more textual elements such as, for example, one or more letters, number, symbols, etc. User Interface 426 can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, auto-sizing, position, and/or dimension, etc. User Interface 426 can include one or more audio elements such as, for example, a volume control, pitch control, speed control, voice selector, and/or one or more elements for controlling audio play, speed, pause, fast forward, reverse, etc. User Interface 426 can include one or more video elements such as, for example, elements controlling video play, speed, pause, fast forward, reverse, zoom-in, zoom-out, rotate, and/or tilt, etc. User Interface 426 can include one or more animation elements such as, for example, elements controlling animation play, pause, fast forward, reverse, zoom-in, zoom-out, rotate, tilt, color, intensity, speed, frequency, appearance, etc. User Interface 426 can include one or more haptic elements such as, for example, elements utilizing tactile stimulus, force, pressure, vibration, motion, displacement, temperature, etc.

Display and Input Devices in Operation

Figure 5:
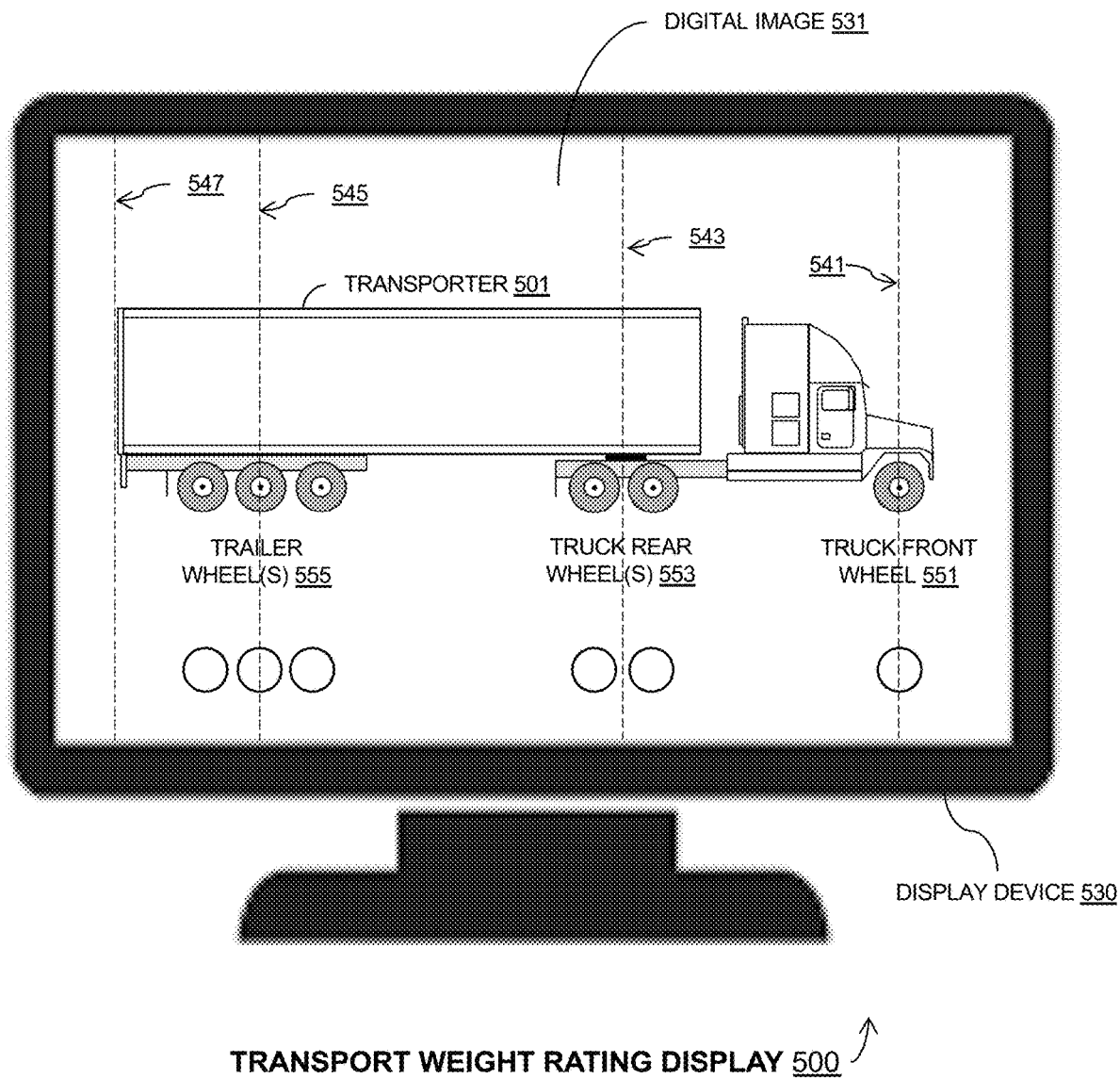
FIG. 5 illustrates an exemplary embodiment of a display component of a system and method for determining a weight rating of a transporter, in accordance with the present invention.

FIG. 5 illustrates an exemplary embodiment of a Transport Weight Rating Display 500 component of a system and method for determining a weight rating of a transporter, in accordance with the present invention. Display 500 may be configured to display a Digital Image 531 of a transporter such as Transporter 501 on Display Device 530. Display 500 may also be configured to display Vertical Guides 541, 543, 545, and 547 on Display Device 530. A Vertical Guide is a line that is oriented vertically (i.e., up/down) on Display Device 530 and may be aligned by a user over a wheel or axle or axle group on the Transporter 501 shown in Digital Image 531. In some embodiments, a Vertical Guide may be aligned over an axle group rather than over a single axle. For example, in FIG. 5, Vertical Guide 541 is aligned over Truck Front Wheel 551; Vertical Guide 543 is aligned over Truck Rear Wheels 553; Vertical Guide 545 is aligned over Trailer Wheels 555; and Vertical Guide 547 is aligned over the rear end of Transporter 501. In some embodiments, there may be more or fewer vertical guides.

Figure 6:
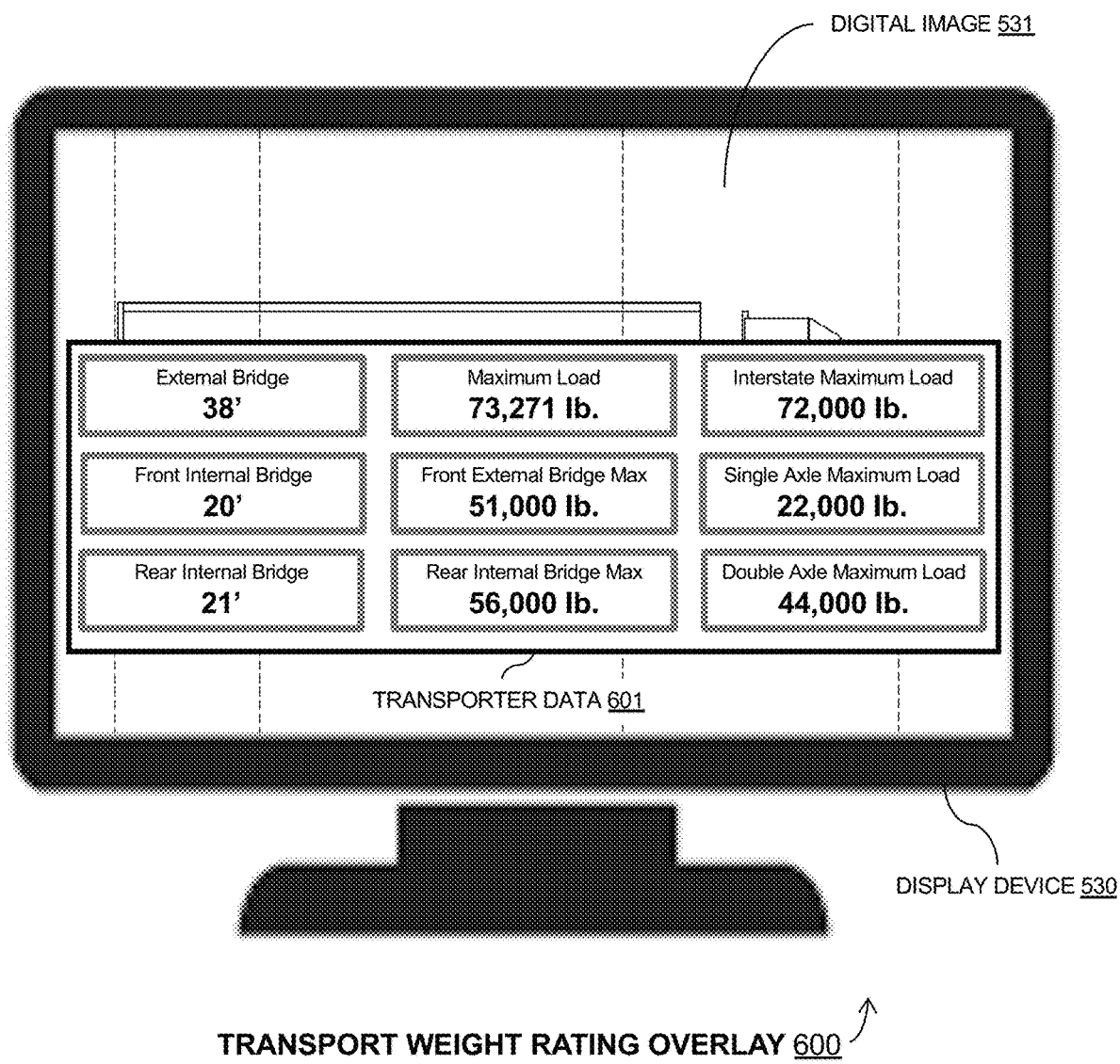
FIG. 6 illustrates an exemplary embodiment of a graphic overlay component of a system and method for determining a weight rating of a transporter, in accordance with the present invention.

FIG. 6 illustrates an exemplary embodiment of a graphic overlay component (shown as Transporter Data 601) of a system and method for determining a weight rating of a transporter, in accordance with the present invention. FIG. 6 illustrates the same Display 500 component as shown in FIG. 5, but in FIG. 6 it is labeled Transport Weight Rating Overlay 600. As in FIG. 5, Transport Weight Rating Overlay 600 may be configured to display a Digital Image 531 of a transporter such as Transporter 501 on Display Device 530. However, in FIG. 6, a graphic overlay is illustrated, which displays Transporter Data 601 comprising information about a transport such as Transporter 501, that was imaged and shown in Digital Image 531. Various information may be displayed in the graphic overlay comprising Transporter Data 601. For example, in Transporter Data 601, the Gross Allowable Weight rating is displayed as "Maximum Load 73,271 lb." During normal operation, Transporter Data 601 may or may not be shown, depending on the operation(s) currently being performed.

Figure 7:
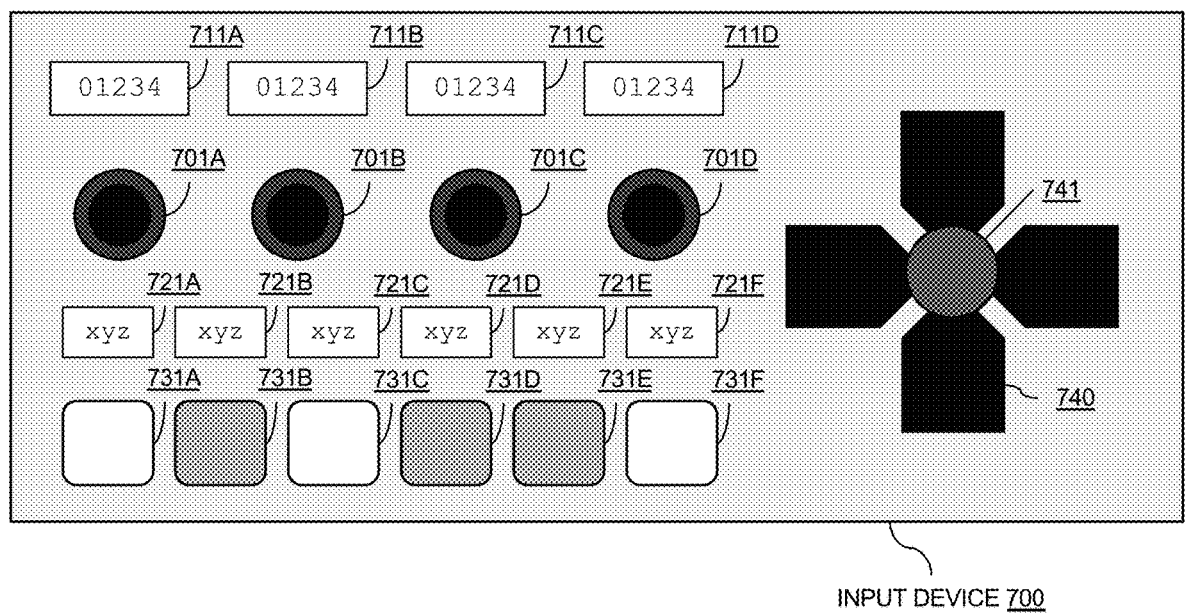
FIG. 7 illustrates an exemplary embodiment of an input device component of a system and method for determining a weight rating of a transporter, in accordance with the present invention.

FIG. 7 illustrates an exemplary embodiment of a Transport Weight Rating Input Device 700 component of a system and method for determining a weight rating of a transporter, in accordance with the present invention. Transport Weight Rating Input Device 700 is the same Input Device 440 that is illustrated in FIG. 4. Transport Weight Rating Input Device 700 may be implemented using a variety of components known to those skilled in the art, including a traditional keyboard, a mouse or joystick or similar pointing and/or selection device, user-selectable buttons, user-settable knobs and/or switches, and/or data displays. Transport Weight Rating Input Device 700 may also be implemented using a smart phone or similar device that is programmed to receive instructions and/or commands from a user.

As illustrated in FIG. 7, Transport Weight Rating Input Device 700 may comprise: (1) a row of four Knobs or encoders 701A-D and four corresponding Knob Indicators 711A-D (the value "01234" shown in 711A-D is illustrative); (2) a row of six Buttons 731A-F and six corresponding Button Indicators 721A-F (the text "xyz" shown in 721A-F is illustrative); and (3) a Joystick 740 or other similar user selection device, such as a device comprising a pan-tilt and/or left-right-up-down movement actuators. In some embodiments Joystick 740 may also have a Joystick Button 741 that can be used as a selection actuator.

Knobs 701A-D may be programmed to perform certain functions at certain times, the results of which may be shown or displayed by Knob Indicators 711A-D.

Buttons 731A-F may be programmed to perform certain functions at certain times, corresponding to the names of functions displayed by Button Indicators 721A-F. Each of the Buttons 731A-F may be configured to light up or display certain colors under certain conditions.

Systems and Methods Details

Figure 8:
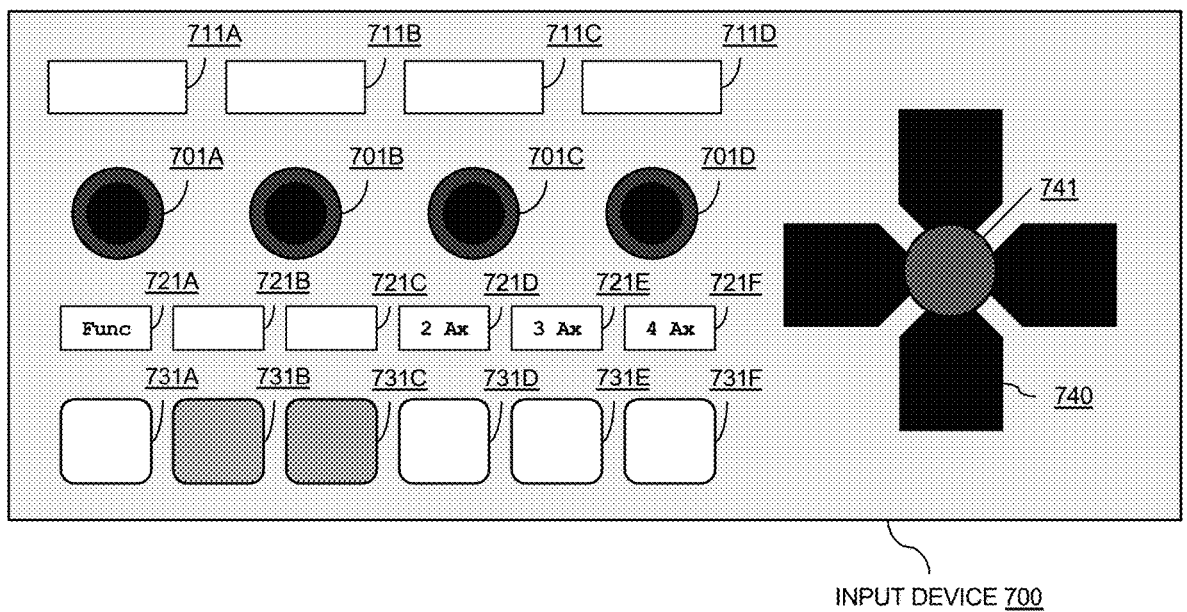
FIG. 8 illustrates an exemplary embodiment of the same input device component of a system and method for determining a weight rating of a transporter shown in FIG. 7, where the input device has been placed in a first operational state, in accordance with the present invention.

FIG. 8 illustrates an exemplary embodiment of the same Transport Weight Rating Input Device component 700 of a system and method for determining a weight rating of a transporter shown in FIG. 7, where the input device has been placed in a first operational state, in accordance with the present invention. As shown in FIG. 8, once System and Method 400 initializes and begins, only four of Buttons 731A-F may be functional. The <Func>, <2 Ax>, <3 Ax>, and <4 Ax> buttons (shown as Buttons 731A, 731D, 731E and 731F, respectively, where each such Button corresponds to Button Indicators 721A, 721D, 721E, and 721F, each displaying the corresponding text "Func," "2 Ax," "3 Ax," or "4 Ax") are available to begin a new Transporter measurement with the corresponding preset values indicating axle groups having two, three, or four axles, respectively.

Figure 9:
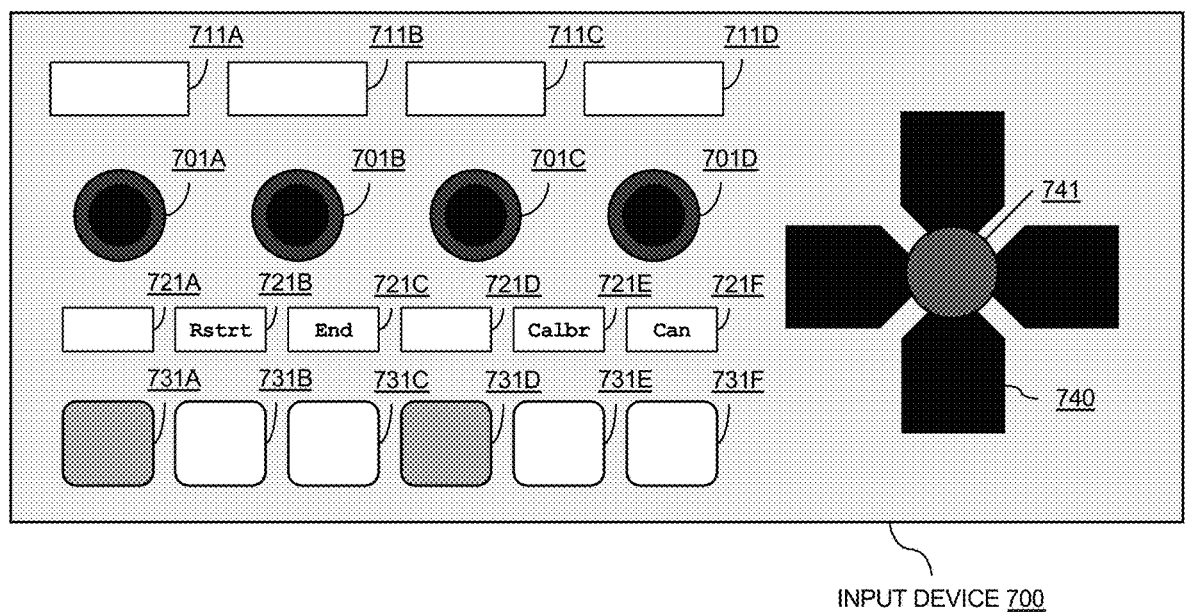
FIG. 9 illustrates another exemplary embodiment of the same input device component of a system and method for determining a weight rating of a transporter shown in FIG. 7, where the input device has been placed in a second operational state, in accordance with the present invention.

When Button Indicator 721A shows text "Func" (as shown in FIG. 8) and Button 731A is pressed, an embodiment of System and Method 400 will respond by configuring Input Device 700 to enter a configuration operation shown in FIG. 9.

FIG. 9 illustrates an exemplary embodiment of the same Transport Weight Rating Input Device 700 component of a system and method for determining a weight rating of a transporter shown in FIG. 7, where the input device has been placed in a second operational state, in accordance with the present invention. In this embodiment, pushing Button 731B, corresponding to Button Indicator 721B labeled <Rstrt> will causes System and Method 400 to restart. Pushing Button 731C, corresponding to Button Indicator 721C labeled <End> to cause System and Method 400 to shut down and/or end. Pushing Button 731E, corresponding to Button Indicator 721E labeled <Calbr> to cause System and Method 400 to initiate a calibration process of System and Method 400. Pushing Button 731F, corresponding to Button Indicator 721F labeled <Can> to cause System and Method 400 to cancel a current weight rating operation and return the user back to the initial phase of a new transporter measurement operation.

Figure 10:
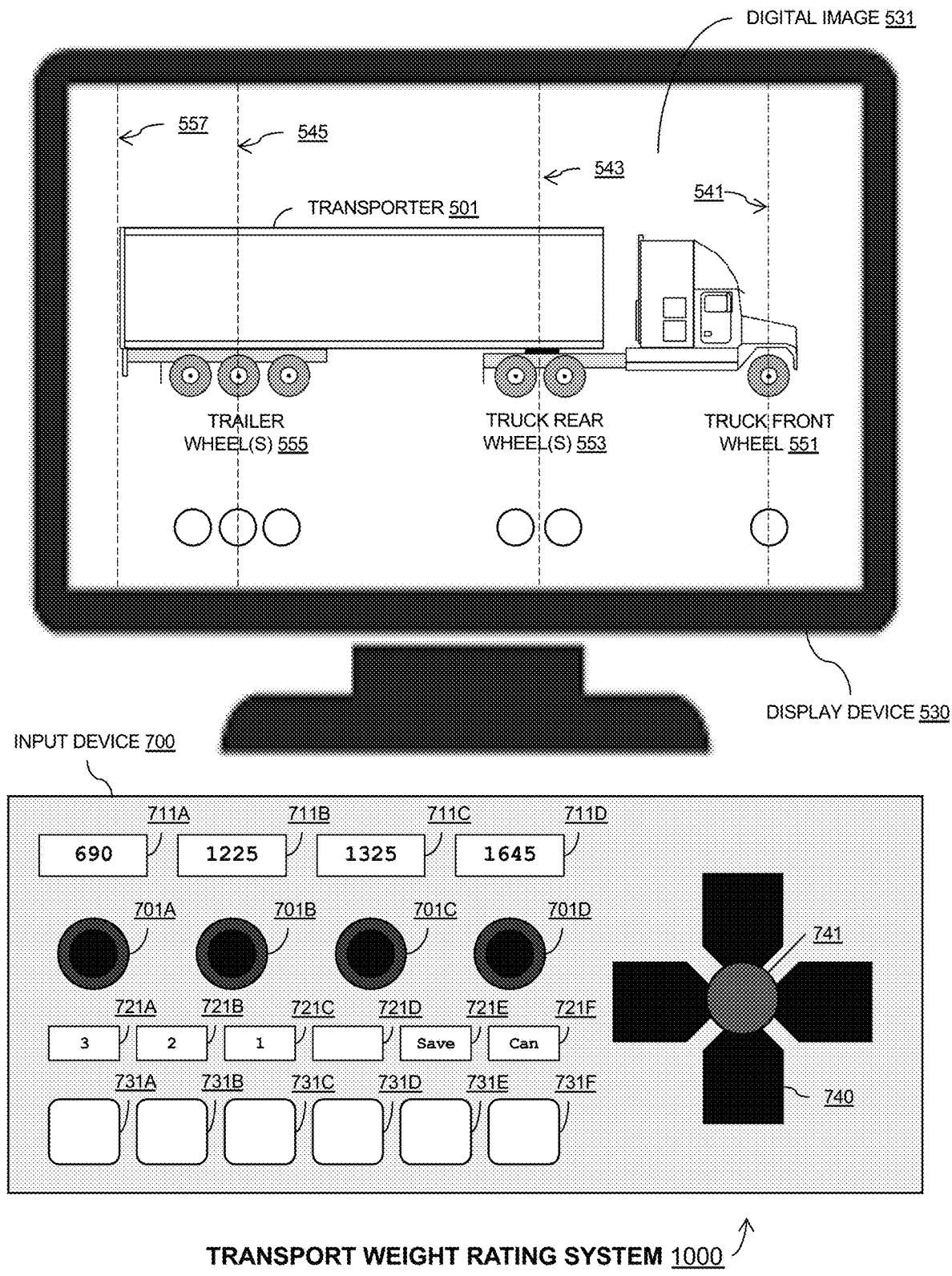
FIG. 10 illustrates an exemplary embodiment of an input device component and a display device component of a transport weight rating system, in accordance with the present invention.

FIG. 10 illustrates an exemplary embodiment of an Input Device component 700 and a Display Device component 530 of a Transport Weight Rating System 1000, in accordance with the present invention. As shown in FIG. 10, Transport Weight Rating System 1000 may comprise Display Device 530 and Input Device 700. Working with both Display Device 530 and Input Device 700, a user (not shown) may use Joystick 740 to move the Vertical Guides 541, 543, 545, and 557 over Digital Image 531 until the lines match the centers of the axles or axle groups visible in Transporter 501 and illustrated as Truck Front Wheel 110, Truck Rear Wheel(s) 120, and Trailer Wheel(s) 130. Alternatively, a user may use any of the four Knobs 701A-D to move the Vertical Guides 541, 543, 545, and 557 over Digital Image 531 until the lines match the centers of the axles or axle groups 551, 553 and/or 555. In some embodiments, a user may use the rightmost Knob 701D to move a vertical guide such as Vertical Guide 541 over the Truck Front Wheel 551 of Transporter 501 shown in the Digital Image 531. In some embodiments, either Joystick 740 or a Knob 701A-F may be so used, and at different speeds, thus providing both coarse and fine adjustment options. To select and move a different vertical guides, such as Vertical Guide 543, a user can turn a different Knob, such as Knob 701C. In some embodiments, a user might use the Joystick 740 and/or the Joystick button 741 to cycle through the various Vertical Guides 541, 543, 545, and 557 and position them over the axles or axle groups visible in Transporter 510.

Once a user has positioned vertical guides, such as Vertical Guides 541, 543, 545, and/or 557, to identify the locations of the axles or axle groups visible in Transporter 501, the user may use Buttons 731A, 731B, or 731C to set the axle count (i.e., the number of axles in an axle group) corresponding to each identified axle or axle group in Transporter 510. In some embodiments, pressing the top of a Button 731A, 731B, or 731C may act as a toggle to raise the corresponding axle count, but pressing the bottom of a Button 731A, 731B, or 731C may act as a toggle to lower the corresponding axle count.

An axle group may be identified with two or more corresponding Vertical Guides. But only a single Button selected from Buttons 731A-F may correspond to an axle count for an axle group associated with a given vertical guide. In some embodiments, the Joystick 740 may be used to change the axle count, for example by moving the Joystick 740 up or down. Button Indicators 721A, 721B, and 721C show that Transporter 501 has 3 axles in the left-most axle group (corresponding to Trailer Wheels 555), 2 axles in the center axle group (corresponding to Truck Rear Wheels 553), and 1 axle in the right-most axle group (corresponding to Truck Front Wheel 551).

Still referring to FIG. 10, a user may use the <Save> Button 731E corresponding to Button Indicator 721E displaying "Save" text, to save all compiled data about the measurements of Transporter 501 to memory (for example to preserve the data for proof of regulatory compliance) and clear Digital Image 531. The <Can> Button 731F (corresponding to Button Indicator 721F displaying "Can" text) may cancel the current transporter measurement operation and may return the user back to the main page to start a new measurement.

Figure 11A:
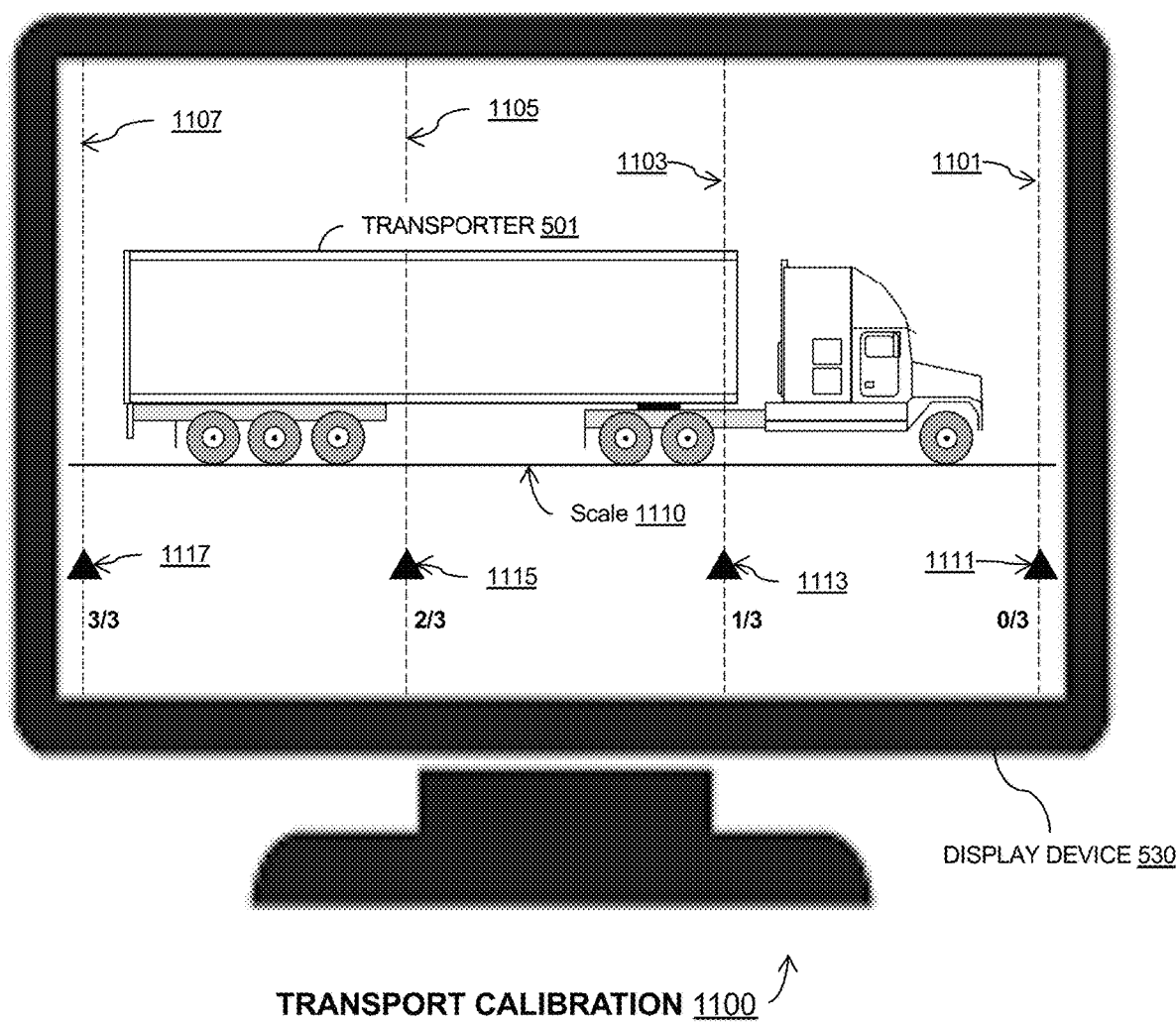
FIG. 11A illustrates an exemplary embodiment of a transport calibration system, in accordance with the present invention.

FIG. 11A illustrates an exemplary embodiment of a Transport Calibration System 1100, in accordance with the present invention. A calibration process may use an input device such as Input Device 700 (for example, the Knobs 701A-F) to identify within Display Device 530 four Registration Points marked on a Transporter Weighing Scale 1110. The Registration Points mark locations at each end of Scale 1110 and each third of the length on it. Registration Point 1111 marks the starting point or zero distance point on the Scale 1110. Registration Point 1113 marks the first third of the distance across the Scale 1110. Registration Point 1115 marks the second third of the distance across the Scale 1110. Registration Point 1117 marks the final third of the distance across the Scale 1110. A user can start a calibration process by pressing the <Calbr> Button 731E (see FIG. 9). Alternatively, a user can start a calibration process of the system 100 by: first pressing the <Func> Button 731A (see FIG. 8); then pressing the <Calbr> Button 731E (see FIG. 9). After the four Registration Points (1111, 1113, 1115, and 1117) have been marked on Display Device 530 by aligning Vertical Guides 1101, 1103, 1105, and 1107 with the four Registration Points 1111, 1113, 1115, and 1117, respectively, calibration can be completed by recording the pixel locations of the Vertical Guides corresponding to each Registration Point.

Figure 11B:
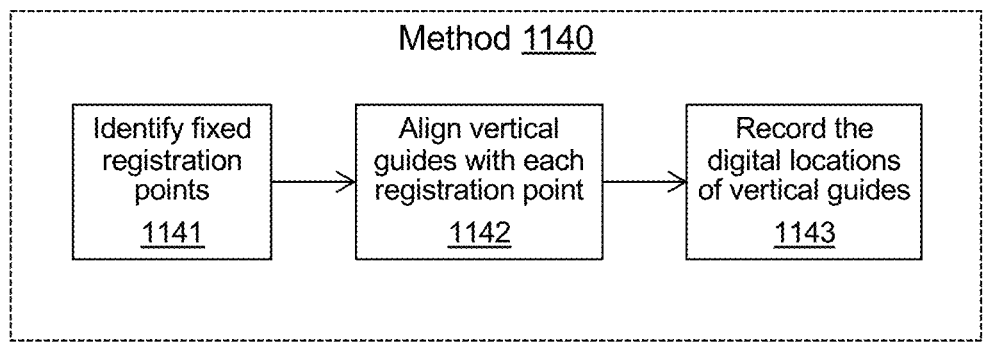
FIG. 11B illustrates an exemplary embodiment of a transport calibration method, in accordance with the present invention.

FIG. 11B illustrates an exemplary embodiment of a Transport Calibration Method 1140, in accordance with the present invention. As described above with respect to Transport Calibration System 1100, Method 1140 may begin at Step 1141 by identifying within Display Device 530 each of the four Registration Points marked on a Transporter Weighing Scale 1110. The fact that System 1100 and Method 1140 use four (4) points is exemplary; one of ordinary skill in the art would understand that other numbers of points may be used. At Step 1142, a user aligns Vertical Guides 1101, 1103, 1105, and 1107 (of FIG. 11A) with the four Registration Points 1111, 1113, 1115, and 1117 (also FIG. 11A). The Method 1140 then records the digital locations of each of the Vertical Guides 1101, 1103, 1105, and 1107 at Step 1143 and creates a mapping for use in determining the physical (versus digital-graphic) locations of, and distances between, wheel axles and/or axle groups in a transporter such as Transporter 501.

Figure 12:
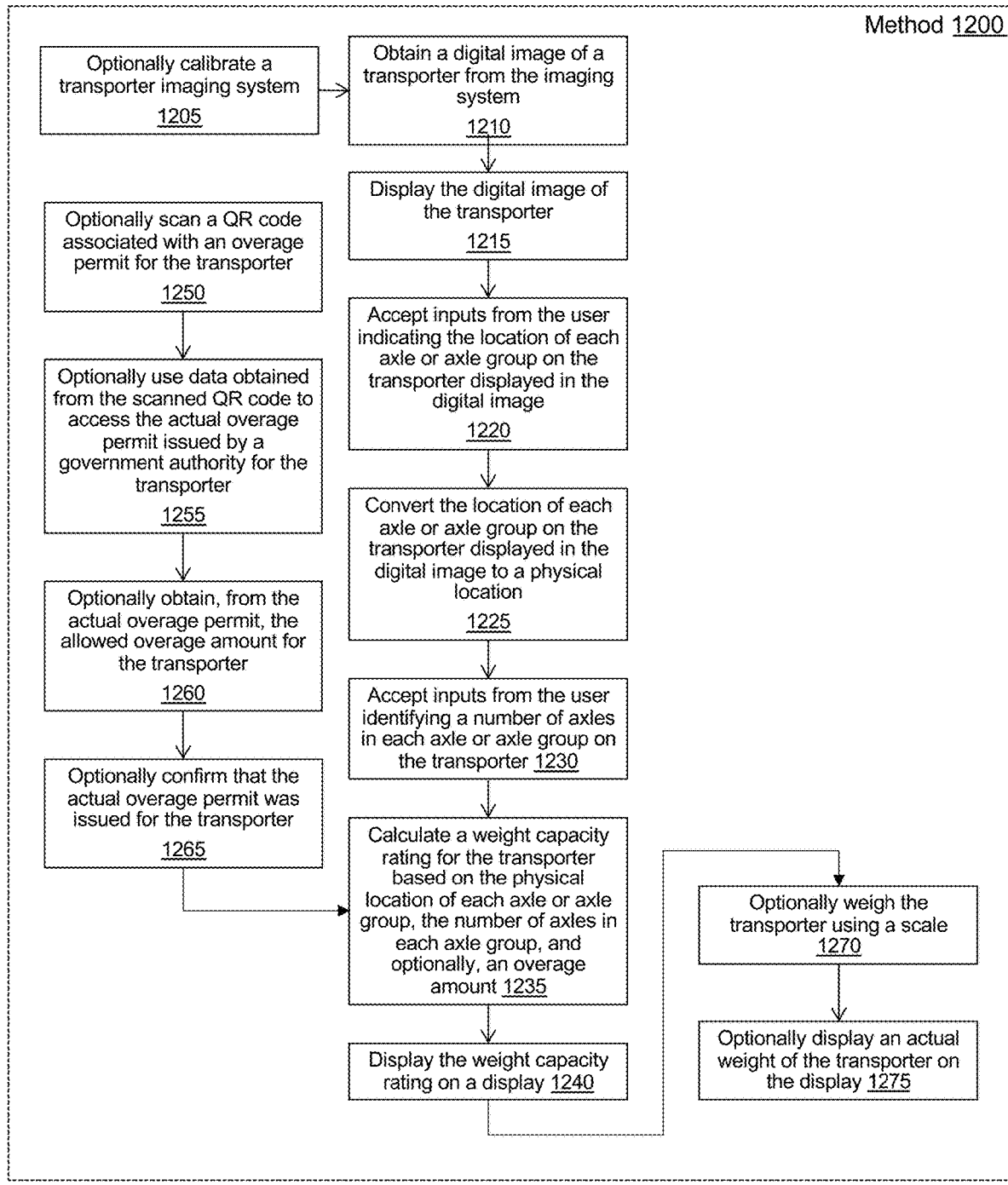
FIG. 12 is a flow chart illustrating an exemplary embodiment of a method for determining a Gross Allowable Weight rating of a transporter, in accordance with the present invention.

FIG. 12 is a flow chart illustrating an exemplary embodiment of a Method 1200 for determining a Gross Allowable Weight rating of a transporter, in accordance with the present invention. The method 1200 comprises Steps 1210, 1215, 1220, 1225, 1230, 1235, and 1240. Method 1200 also comprises optional Steps 1205, 1250, 1255, 1260, 1270, and 1275.

At Step 1205, the transporter imaging system is calibrated, according to the Transport Calibration System 1100 and/or Method 1140, shown in FIGS. 11A and 11B, respectively.

At Step 1210, a digital image such as Digital Image 431 (see FIG. 4A) is obtained of a transporter such as Transporter 401, using a camera such as Camera 410.

At Step 1215, the digital image of the transporter is displayed to an operator/user, via a display device such as Display Device 430 or 530.

At Step 1220, a user interacts with a transporter weight rating system such as Transporter Weight Rating System 1000 shown and described with respect to FIG. 10. Using an input device such as Input Device 700, a user may identify a location of each of the axles on Transporter 401 shown in Digital Image 431. In one embodiment, using Input Device 700, the user-operator (not shown) may manipulate the Digital Image 431 on Display Device 430 to designate, assign, or overlay Vertical Guides 541, 543, 545, and/or 547 over the axles and/or wheels and/or axel groups of Transporter 401.

For example, referring to FIG. 5, a user-operator may select and move Vertical Guide 541 to align with Truck Front Wheel 110. At Step 1225, the graphical-digital location of Vertical Guide 541 may be converted to a relative physical location for later use in determining a weight rating for the transporter. At Step 1230, the user-operator may then use Input Device 700 to identify the number of axles associated with Truck Front Wheel 110 aligned with Vertical Guide 541.

Steps 1220, 1225, and 1230 may be repeated for each axle and/or axle group on the transporter. For example, repeating Step 1220, the user-operator may then select and move Vertical Guide 543 to align with Truck Rear Wheel(s) 120. At Step 1225, graphical-digital location of Vertical Guide 543 may be converted to a relative physical location for later use in determining a weight rating for the transporter. At Step 1230, the user-operator may then use Input Device 700 to identify the number of axles associated with Truck Rear Wheel(s) 120 aligned with Vertical Guide 543.

Repeating Steps 1220, 1225, and 1230 again, the user-operator may repeat Step 1220 to select and move Vertical Guide 545 to align with Truck Rear Wheel(s) 130. At Step 1225, graphical-digital location of Vertical Guide 545 may be converted to a relative physical location for later use in determining a weight rating for the transporter. At Step 1230, the user-operator may then use Input Device 700 to identify the number of axles associated with Truck Rear Wheel(s) 130 aligned with Vertical Guide 545.

This axle selection and number-identification process may repeat until all axles and/or axle groups associated with Transporter 401 have been identified. The axle selection and number-identification process may be accomplished by the user-operator turning Knobs 701A-F, or using Joystick 740 and/or Joystick Button 741.

At Step 1235, Computing Device 420 may run an algorithm to calculate a weight capacity rating for Transporter 401. Preferably, the calculated weight capacity rating will be the Gross Allowable Weight, but other weight ratings may be used. The algorithm will use techniques known by those of ordinary skill in the art to access appropriate rules, charts, tables, and reference materials that define allowable weights for various transporter and/or freight-hauling configurations in the relevant governmental jurisdiction. Such charts, tables, and reference materials may be accessed via the Internet in real time, or they may be downloaded to Computing Device 420 in advance. The algorithm may use the data acquired in Steps 1220, 1225, and 1230 to search the jurisdiction's relevant rules, charts, tables, and reference materials to identify a Gross Allowable Weight (or other desired weight rating) for the jurisdiction corresponding to the transporter's axle and/or axle group configuration.

Optionally, Method 1200 for determining a Gross Allowable Weight rating of a transporter may include steps to process an overage permit (such as Overage Permit 405 shown in FIG. 4A) that can allow a transporter such as Transporter 401 to validly carry additional weight (i.e., to be overweight) under certain conditions.

Normally, in the prior art, truck scales and transport weight rating systems such as Transport Weight Rating System 1000 are required to accept a paper version of overage permits. Embodiments of the present invention reduce or eliminate the possibility that an overage permit may be improperly modified by using a digital optical device such as QR Scanner 415 to scan the QR code.

At Step 1250, a transport driver may provide an Overage Permit 405 to an operator of a transport weight rating system such as Transport Weight Rating System 1000. The operator may then use Scanner 415 to scan a QR code on Overage Permit 405 and send the scanned QR code to the Computing Device 420. At Step 1255, Computing Device 420 may use the data obtained from the QR code to access the actual overage permit issued by a governmental or jurisdictional authority for Transporter 401 (for example, a digital PDF version of the Overage Permit 405 may be obtained) via a network such as the Internet. At Step 1260, the allowed overage amount for Transporter 401 may be obtained from the actual overage permit. The VIN number of Transporter 401 and other identifying information may also be obtained from the digital PDF version of the Overage Permit 405. At Step 1265, the operator of the transport weight rating system may confirm that the Overage Permit 405 was issued for Transporter 401 by comparing the VIN number on Transporter 401 to the VIN number specified in the Overage Permit 405.

As described above, Computing Device 420 may run an algorithm at Step 1235 to calculate a weight capacity rating for Transporter 401, where the weight capacity rating includes the overage amount specified by actual overage permit.

At Step 1240, after a weight capacity rating has been calculated, the weight capacity rating may be displayed on Display Device 430 (or 530), for example displaying the weight capacity rating within the Transporter Data 601 shown in FIG. 6.

At Step 1270, the transporter may be optionally weighed using a scale such as Scale 1110 (see FIG. 11).

At Step 1275, the actual weight of Transporter 401 determined in Step 1270 may be displayed on Display Device 430 (or 530). At this point, the actual weight of Transporter 401 may be compared to the weight capacity rating determined at Step 1235 to determine if Transporter 401 is overweight.

Benefits and Advantages

Embodiments of the systems and methods disclosed herein provide the advantage of quickly determining an objective maximum gross allowable weight for a transporter, which can then be compared against the actual weight of the transporter to demonstrate regulatory compliance.

Embodiments of the invention can determine a gross allowable weight for a transporter in much less time than systems and methods found in the prior art: in seconds rather than many minutes. This gain in efficiency can translate to significant savings, both for transporters and their trucking companies, as well as the jurisdictional agencies tasked with ensuring transporters are compliant with regulatory requirements.

Embodiments of the invention also improve the accuracy of the transport weight rating process because many of the tasks that are currently done manually, are automated and therefore mistakes are significantly reduced.

With respect to overage permits, embodiments of the invention can significantly reduce the possibility of fraud, because QR codes are very difficult to fake, and embodiments described herein are not reliant on the text printed on a paper permit provided by a transport operator. Instead, a QR code enables the originally issued version of an overage permit to be accessed from a jurisdictional database and verified directly. This improves the efficiency and the accuracy of transport weigh rating systems.

Variations

It is to be understood that any element of the disclosed embodiments may be implemented in a single structure, a single step, a single substance, or the like. Similarly, a given element of the disclosed embodiment may be implemented in multiple structures, steps, substances, or the like.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and are capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

While the foregoing descriptions have described specific embodiments of the present invention and many details have been put forth for the purpose of illustration or example, it will be apparent to one skilled in the art that the invention is susceptible to additional embodiments and that certain of the details described herein can be varied considerably without departing from the basic principles of the invention.

Embodiments of the present invention can be realized in hardware, software, or a combination of hardware and software. Embodiments can be realized in a centralized fashion in one computing system, or in a distributed fashion where different elements are spread across several computing systems. Any kind of computer system or other apparatus adapted for implementing the limitations described herein is suitable.

Although the present disclosure provides certain embodiments, other embodiments apparent to those of ordinary skill in the art, including embodiments that do not provide all the features and advantages set forth herein, are also within the scope of this disclosure.

The foregoing disclosure has been set forth merely to illustrate the invention and is not intended to be limiting. It will be appreciated that modifications, variations, and additional embodiments are covered by the above teachings and within the purview of the appended claims without departing from the spirit and intended scope of the invention. Other logic may also be provided as part of the exemplary embodiments but are not included here so as not to obfuscate the present invention. Since modifications of the disclosed embodiments incorporating the spirit and substance of the invention may occur to persons skilled in the art, the invention should be construed to include everything within the scope of the appended claims and equivalents thereof.

The invention claimed is:

1. A computer method for determining the maximum gross combined weight of a transporter comprising:

obtaining, with a camera, a digital image of a transporter positioned on a measuring platform;

receiving the digital image in a computer;

displaying the digital image on a display device connected to the computer;

accepting, in the computer, a first plurality of inputs from an input device controlled by a user, where the first plurality of inputs identify in the displayed digital image an image location of each axle group on the transporter;

accepting, in the computer, a second plurality of inputs from the input device, where the second plurality of inputs specify the number of axles in each identified axle group;

converting each of the identified image axle locations to a relative physical axle location using a set of previously generated calibration data;

measuring the actual distance between each of the axle groups utilizing the relative physical axle locations;

scanning a QR code on an overage permit associated with the transporter;

using the QR code, accessing a digital version of the overage permit via a network;

obtaining an allowed overage amount for the transporter from the accessed digital version of the overage permit;

calculating a maximum gross allowable weight rating for the transporter, based on the specified number of axles in each identified axle group, the measured actual distance between each of the axle groups, and the allowed overage amount; and displaying the maximum gross allowable weight rating on the display device.

* * * * *